United States Patent
Moore

[15] 3,700,964
[45] Oct. 24, 1972

[54] MOTOR OVERLOAD PROTECTOR AND VOLTAGE CUT-OUT DEVICE

[72] Inventor: Thomas Moore, 7235 Leavitt Road, Elyria, Ohio 44035

[22] Filed: Sept. 22, 1970

[21] Appl. No.: 74,277

Related U.S. Application Data

[63] Continuation-in-part of Ser. No. 773,923, Nov. 6, 1968, Pat. No. 3,530,377.

[52] U.S. Cl. .................. 317/13 C, 317/40 R, 317/46
[51] Int. Cl. ......................... H02h 5/04, H02h 7/08
[58] Field of Search ..317/13 C, 18 R, 40 R, 46, 14 J; 318/471, 476; 340/248 R, 252 R, 252 H, 252 P, 253 R, 253 A

[56] References Cited

UNITED STATES PATENTS

| | | | |
|---|---|---|---|
| 3,530,337 | 9/1970 | Moore | 317/13 C |
| 2,189,591 | 2/1940 | McShane | 317/13 C |

Primary Examiner—J. D. Miller
Assistant Examiner—Harry E. Moose, Jr.
Attorney—Mason, Mason & Albright

[57] ABSTRACT

A current responsive motor overload protector for a three-phase AC motor wherein there are three bimetallic elements each of which is incorporated in a switch, each such switch being in series with a phase lead of a three-phase AC voltage source and also with a motor lead. Each of the bimetallic elements normally maintaining its respective switch in a closed position and opening automatically or bending towards an open condition due to the heating effects of a current passing through it when the motor is in an overload condition. A further circuit is included in the protector which is responsive to the opening, or bending, of each bimetallic element switch and when one of a bimetallic element switch opens at least in part, it energizes the further circuit which actuates a solenoid which, in turn, simultaneously causes each of the bimetallic element switches to open in a quick acting movement. A movable biased toggle mechanically secures the solenoid so that the bimetallic strip switches are retained in the open position until the toggle is manually reset. The toggle also opens a switch in a further circuit which serves to secure the current to the solenoid. An indicia means such as a lamp, buzzer or bell, or combination thereof, is connected between one of the electrical phase sources on one side and to a ground or a motor-phase lead via contacts which are closed responsive to the opening of each metallic switch on the other side. Warning indicia may be provided which is energized by a contact with each bimetallic element prior to the opening thereof when the overload condition of the metallic element is not sufficient to energize the further circuit.

15 Claims, 6 Drawing Figures

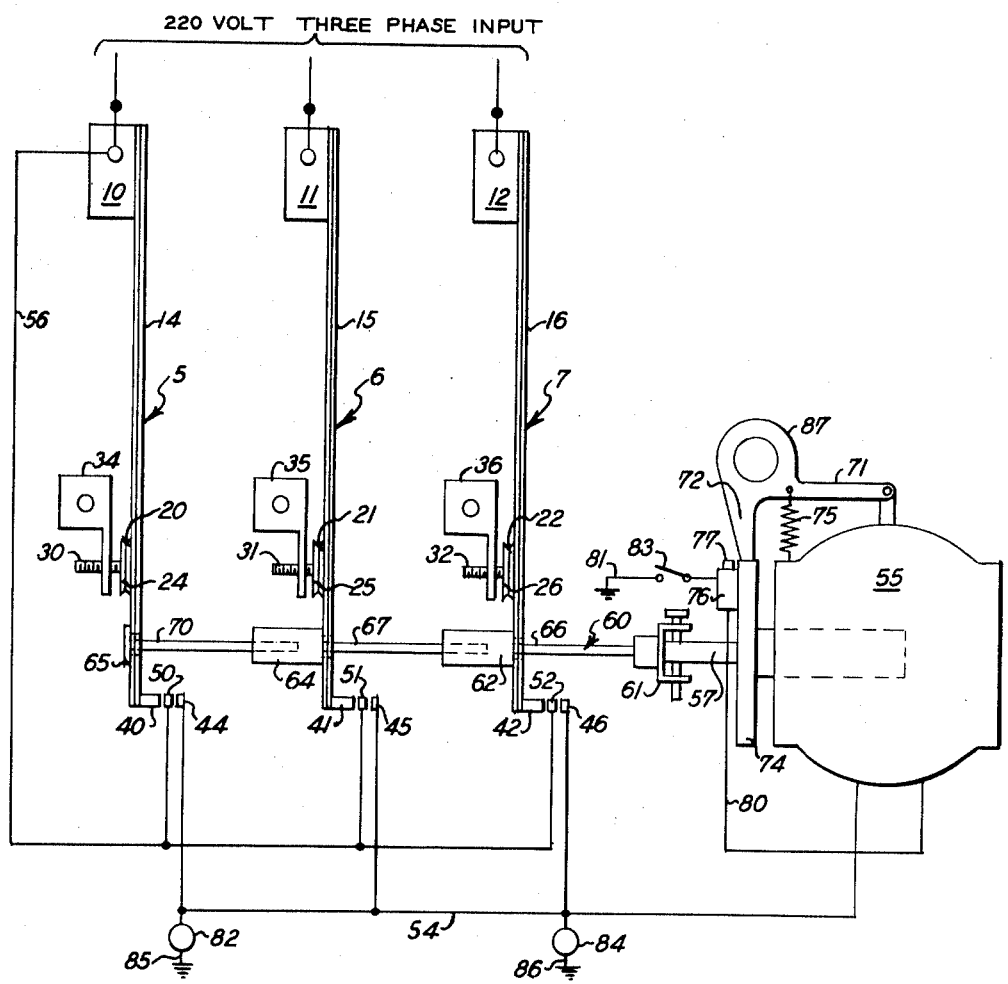
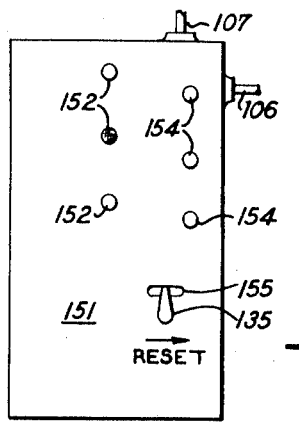
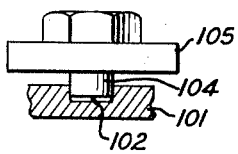
Fig.1
Fig.3
Fig.4
INVENTOR
THOMAS MOORE

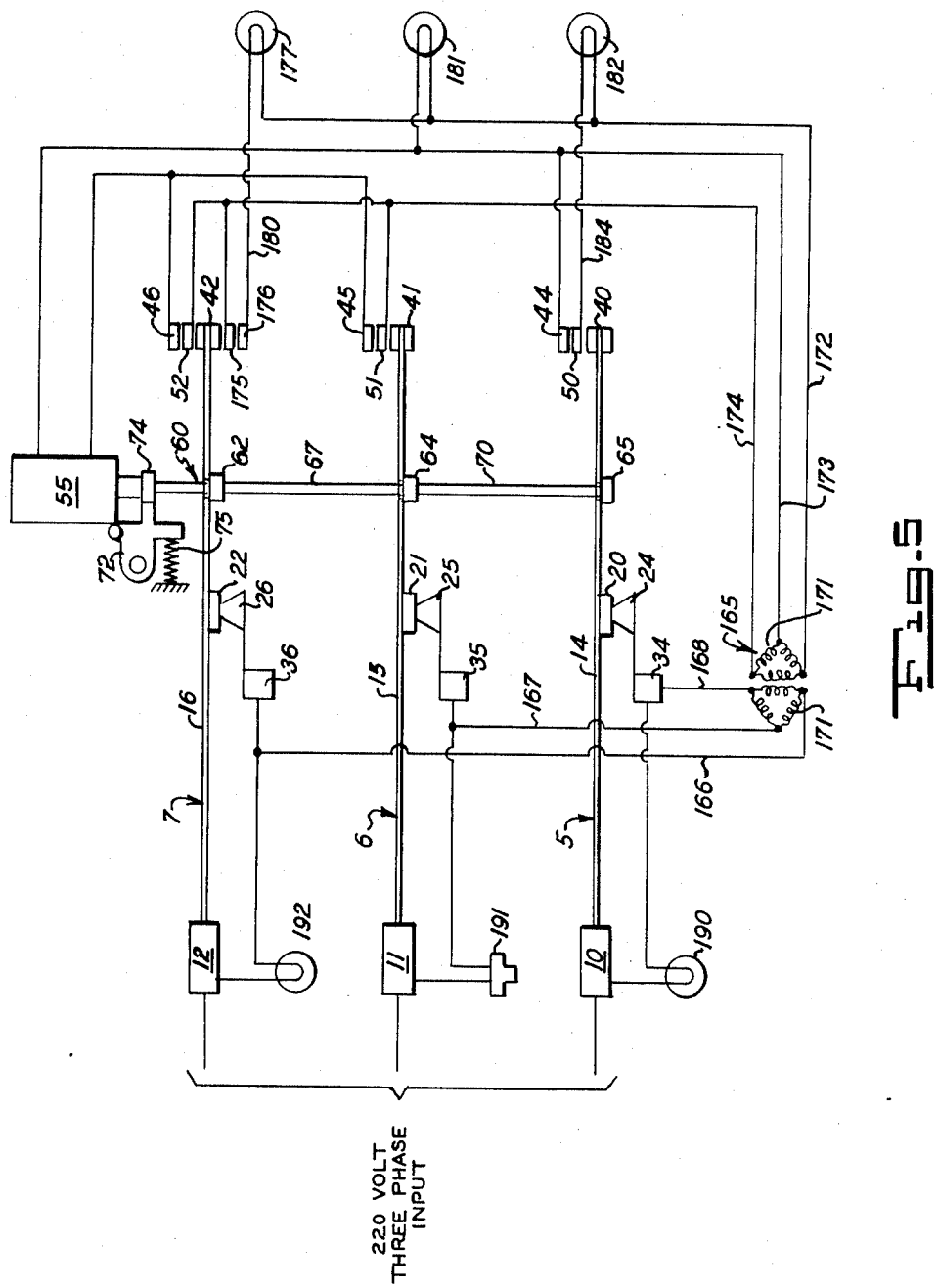

3,700,964

MOTOR OVERLOAD PROTECTOR AND VOLTAGE CUT-OUT DEVICE

CROSS REFERENCES TO RELATED APPLICATIONS

This is a continuation-in-part application of my application Ser. No. 773,923 filed Nov. 6, 1968, and now U.S Pat. No. 3,530,377.

BACKGROUND OF THE INVENTION

The invention is in the field of power overload cutouts for three-phase electric motors and apparatus for removing dangerous voltage from motors responsive to a serious overload condition.

The parent application identified above deals with a power overload indicator and apparatus for removing dangerous voltage, primarily for household-type motors and smaller industrial motors. However, it is not specifically designed for three-phase motors wherein the cut-out of the single phase would not afford the required motor protection. Three-phase motors subject to frequent and prolonged overload conditions such as may be found in car washers, coal mines, and steel mills, frequently burn out in spite of conventional overload devices designed to protect them against over-current conditions. The reason is that such devices may permit a motor to operate for an extended period with its current drawing just below that which will actuate the over-current protection device, whereby after a period of time the temperature deleteriously affects the insulation. Thus, present overload protectors which are practical from the standpoint of not being overly costly generally afford overload protection for currents which are at a level exceeding that which may result in damage to the motor over a prolonged period of time. This is not a new problem and the fact that it continues to exist is strongly indicative that there is and has been a need for a device in accordance with the invention for many years.

SUMMARY OF THE INVENTION

Although overload devices known as thermal overload relays, thermal cut-outs and thermal relays have been known for many years, their utilization has usually involved indirect heating or fusable components. However, I have found that from a practical standpoint, bimetallic elements, when placed in series with an electrical current supplied to a motor, have the characteristic of being able to cut out quickly in high overload conditions. They also effectively break circuits, although somewhat more slowly, when the overload conditions are only slightly above a normal power requirements of the motors. By utilizing this characteristic in combination with a solenoid which opens all phases of a three-phase motor quickly and simultaneously and with lamps or other indicia means, I have provided an overload protector which is particularly useful for three-phase motors of the type which now tend to burn out despite the use of contemporaneous circuit breakers. The components of the device are inexpensive and long lasting. They are easily mounted and fit within a receptacle of reasonably convenient size and are adaptable to various adjustments depending upon the specific type of motor and the degree of overload protection desired.

BRIEF DESCRIPTION OF DRAWINGS

Other objects, adaptabilities and capabilities, will appear as the description progresses, reference being had to the accompanying drawings, in which:

FIG. 1 is a diagrammatic representation of various components included in the system of the invention;

FIG. 3 is a fragmentary view in partial section showing the electrical connection from the motor lead with the bimetallic switch;

FIG. 4 is a front elevation of a cover plate for the device shown in FIG. 2; and FIGS. 5 and 6 are diagrammatic representations of further embodiments similar to that shown in FIG. 1.

DESCRIPTION OF THE PREFERRED EMBODIMENTS

Figure 2:
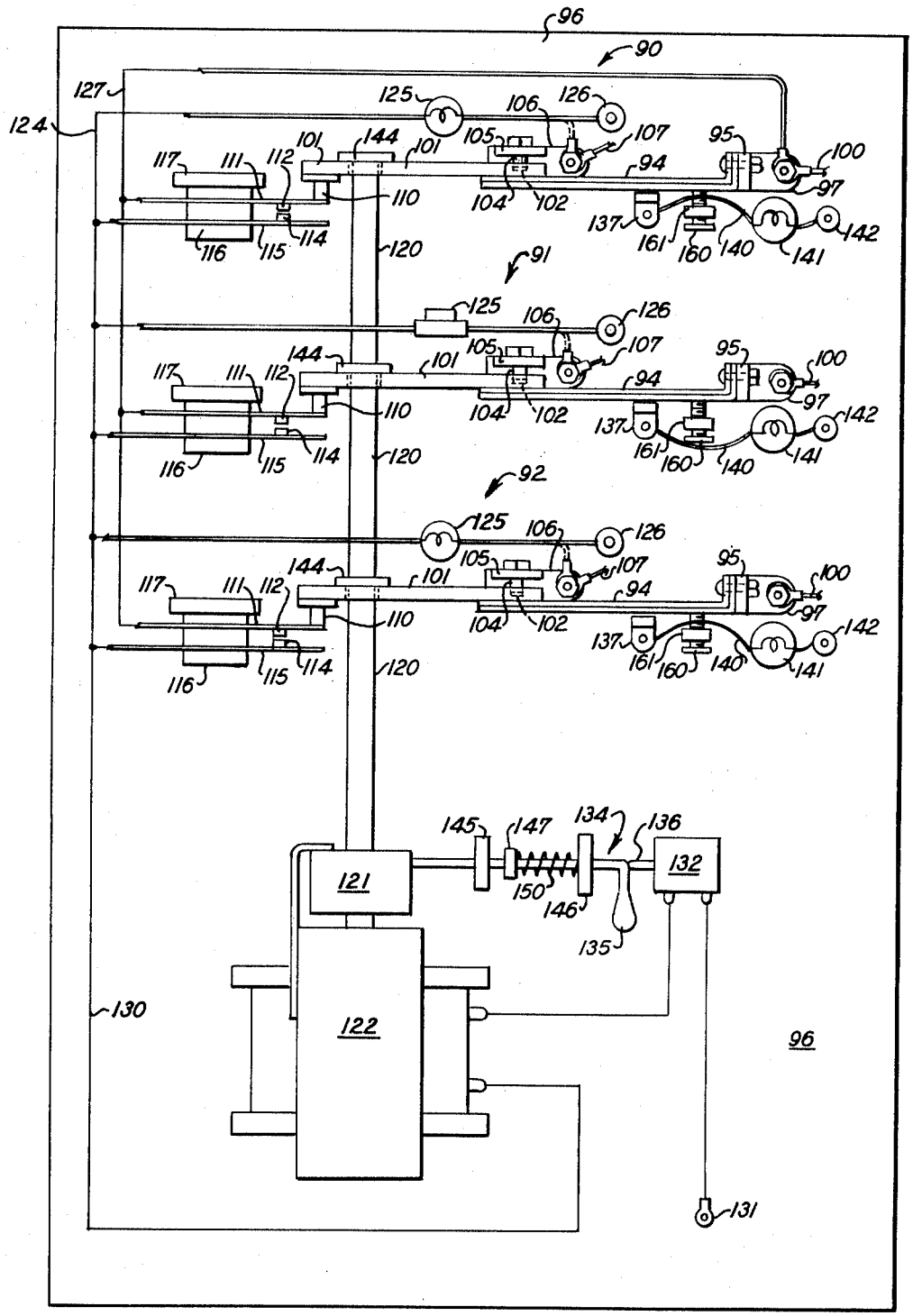
FIG. 2 shows a device in accordance with the invention mounted on a backboard of the receptacle.

Referring to FIG. 1, it will be noted that a 220 volt three-phase power input leads into switches designated generally 5, 6 and 7, via terminals 10, 11 and 12, each of which has secured thereto a bimetallic element 14, 15 and 16. At the opposite ends of each of the bimetallic elements 14, 15 and 16, there are affixed contacts 20, 21 and 22, respectively, which, when the bimetallic elements 14, 15 and 16 are in the closed position, engage stationary contacts 24, 25 and 26, respectively. Each of the stationary contacts 24, 25 and 26 are secured to threaded members 30, 31 and 32, respectively, which are threadably received by the motor lead terminals 34, 35 and 36, respectively. At the end of the bimetallic elements 14, 15 and 16, opposite terminals 10, 11 and 12, tappets 40, 41 and 42 are provided which are composed of an insulating material of high dielectric characteristics. Opposite tappets 40, 41 and 42 are stationary contact members 44, 45 and 46 and between said tappets and stationary contact members are movable contact members 50, 51 and 52, respectively. A circuit 54 connects to each of the stationary contact members 44, 45 and 46 to solenoid 55. A further circuit 56 electrically connects terminal 10 to the movable contact members 50, 51 and 52. The solenoid 55 includes a movable bar member 57 which connects to an arm 60 through a coupling member 61. Arm 60 includes enlarged portions 62, 64 and 65, which bear against the bimetallic elements 14, 15 and 16, and neck portions 66, 67 and 70 which pass through openings in the bimetallic elements 16, 15 and 14, respectively, whereby when arm 60 is drawn to the right as seen in FIG. 1, the bimetallic elements 14, 15 and 16 also are moved to the right and the contacts 20, 21 and 22 are disengaged from the stationary contacts 24, 25 and 26. A toggle 71, hingedly mounted on top of solenoid 55, has a handle portion 87 and an underlying catch portion 72 bearing on a plate 74 which is affixed to bar member 57. A helical-type tension spring 75, connected between toggle 71 and the solenoid 55 urges the lower end of catch portion 72 against the upper part of plate 74. A spring biased switch 76 is mounted on the plate 74 and includes a button member 77 which opens switch 76 when pushed down. Catch portion 72 of toggle 71 is so positioned relative to the switch 76 that when the plate 74 moves to the right due to actuation of the solenoid 55, the lower end of catch portion 72 is urged by the spring 75 against the button member 77 to open the switch 76. A delay component (not shown) may be incorporated in switch 76 adapted to delay the closing of switch 76 for a short period — sufficient for arm 60 to restore switches 5, 6 and 7 to closed position — when catch portion 72 is manually lifted from button member 77 by handle 87. It will be seen that switch 76 connects an electrical line 80 from solenoid 55 with a grounded lead 81 which may optionally include a further switch 83 that is normally closed. A bell 82 and a light 84 are connected to circuit 54 and to ground leads 85 and 86, respectively. These indicia means, bell 82 and light 84, have a high resistance contrasted to solenoid 55.

In operation, an excess of current through any of the bimetallic elements 14, 15 and 16 causes such element to move to the right as seen in FIG. 1 whereby one of the tappets 40, 41 and 42 moves its corresponding movable contact member 50, 51 or 52 to engage the opposed stationary contact member 44, 45 or 46, whereby electrical current from the terminal 10 energizes the solenoid 55 which in turn moves the bar member 57, together with the plate 74 and arm 60, to the right (as seen in FIG. 1) to disengage each of the stationary contacts 24, 25 and 26 from the contacts 20, 21 and 22 affixed to the bimetallic elements 14, 15, and 16, respectively. Upon plate 74 moving to the right, the toggle 71 is drawn by the spring 75 to engage and push down the button member 77 of the switch 76 which opens the lead 80 (with switch 83 closed) from the solenoid 55 and de-energizes same. The catch portion 72, in addition, mechanically prevents the plate 74 from moving to the left as seen in FIG. 1 which is its normal resiliently urged position until the toggle 71 is manually lifted by means of handle portion 87. Also, upon circuit 54 being connected to circuit 56 through contact members 50 and 44, 51 and 45, and 52 and 46, bell 82 and light 84 are energized, thereby calling attention to the open condition of the bimetallic elements 14, 15 and 16. To reset the protector, handle position 87 is raised whereby plate 74 is disengaged by a catch portion 72 and is resiliently urged by a spring in solenoid 55 together with arm 60 to the left as seen in FIG. 1 so that switches 5, 6 and 7 are again closed. For this to occur, it is necessary for switch 76 to be delayed briefly in closing, or switch 83 to be opened, or the power input to be disengaged.

In the embodiment shown in FIG. 2, there are three identical switches which are designated generally 90, 91 and 92, each of which includes a bimetallic member 94 which is secured to a bracket 95 which in turn is mounted on a backing plate 96 which preferably is composed of a highly dielectric material. The bracket 95 includes a three-phase AC source terminal 97 and each wire 100 is connected to a phase of a three-phase 220 volt AC source. The bimetallic member 94 has an extension piece 101 affixed thereto. As may be seen best in FIG. 3, the piece 101 includes a cylindrically shaped depression 102 which receives and engages a cylindrical electrical contact part 104. Part 104 is mounted on a bracket member 105 which includes a motor lead terminal 106 which has secured thereto a conductor 107 leading to a 220 volt three-phase AC motor. At the opposite end of piece 101 a tappet 110 composed of insulating material is mounted so that it bears upon a spring conductor 111 which carries a contact member 112 spaced relative to a stationary contact member 114 which is mounted on a further spring conductor 115. The spring conductors 111 and 115 are mounted on a block of insulating material 116 which is affixed to backing plate 96 by a further bracket 117. Each extension piece 101 has an opening which receives an arm 120 connected to the bar member 121 of a solenoid 122. For each switch 90, 91 and 92, there is a circuit 124 which connects the ground terminal 126 with the spring conductor 115 and contains indicia means 125 which has a comparatively high electrical resistance compared to the motor which is protected and also solenoid 122. In the switches 90 and 92 the indicia means is a lamp and in the switch 91 it is a buzzer. In the event that the motor component to which conductor 107 is connected includes connection to a ground component, then the circuit 124 may be connected to one (and only one) of the ground terminals 106 as indicated by dotted lines in a switch 90, 91 or 92. A further circuit 127 connects one terminal 97 with each of the spring conductors 115 with solenoid 122. The solenoid 122 is further connected to a ground terminal 131 via a spring biased switch 132. The switch 132 is held in a closed position by bar 134 which includes a handle 135. The switch 132 is normally closed in the position shown in FIG. 2 but is of a type that includes a toggle so that in order to close same from an opened position the button 136, which is normally biased outward, must be moved by bar 134 slightly to the right of the position shown in FIG. 2.

Each of the switches 90, 91 and 92 have a contact member 137 which is affixed to the backing plate 96 and spaced a short distance from metallic member 94 so that the metallic member 94 contacts member 137 before the movable contact 112 is caused to engage stationary contact 114. A conductor 140 leading from member 137 connects same through a lamp 141 to a ground terminal 142.

Arm 120 has three enlarged portions 144 affixed thereto, each of which is located to bear against the extension piece 101 of the switches 90, 91 and 92.

The bar 134 is slidably carried by a pair of brackets 145 and 146 extending from backing plate 96 and includes a stop part 147 mounted thereon. A helical compression spring 150 is held in compression between bracket 146 and part 147 so as to urge the end of bar 134 against the bar member 121.

A cover plate 151 is shown in FIG. 4. It will be noted that it has openings 152 for the indicia means 125 and further openings 154 are provided for lamps 141. A slot 155 receives the handle 135 of bar 134.

In operation, if one of the phases of the motor is receiving more than its desired amount of current, the bimetallic member 94 in series therewith is heated thereby and bends downwardly as viewed in FIG. 2 to engage the contact number 137 whereupon the lamp 141 lights and this condition may be seen by the operator through one of the openings 154 in the cover plate 151. In the event that the condition continues for a prolonged period of time or is otherwise aggravated, the metallic member 94 bends somewhat more whereby the tappet 110 causes contact members 112 and 114 of the switch affected to engage whereby current is supplied to the solenoid 122 via the circuit 127, contact members 112 and 114, and circuit 130. The energized solenoid 122 causes the bar member 121, together with the arm 120, to move rigidly in downward direction as seen in FIG. 2 whereby the bar 134 moves to the left as seen in FIG. 2 to hold the solenoid in such position and to open the switch 132 which de-energizes the solenoid.

When the circuit 130 is initially energized, current is also supplied to the circuit 124 and actuates indicia means 125 thus calling the attention to the open position on the overload protector. To reset the protector, the handle 135 is moved to the right to unblock the bar member 121 whereupon a spring incorporated in solenoid 122 returns the bar member 121 and arm 120 to the position shown in FIG. 2. In manually so moving handle 135, it is inevitably moved somewhat farther to the right than is necessary to close switch 132 and thus solenoid 122 is momentarily in a de-energized state while the bar member 121 and arm 120 is returned to the position shown in the figure. The movement of the button 136 slightly to the right of its position shown in FIG. 2 is necessary to reset same to a closed position and give sufficient time for movement by arm 120 to open contact members 112 and 114. Otherwise the solenoid will not de-energize unless a switch (not shown) to wires 100 is opened.

It will be appreciated that the electrical contact part 104 may continue to maintain contact with piece 101 while the contact members 114 and 112 are brought into engagement. Of course, once the engagement of these contacts takes place, solenoid 122 is actuated whereby electrical contact part 104 is immediately disengaged from the piece 101 to avoid any prolonged arcing.

The amount of current required to cause the metallic member 94 to bend sufficiently to bring the contact members 112 and 114 into engagement can be adjusted by means of a threaded member 160 which is threadably received in a bracket 161 extending from the backing plate 96, and which bears against the metallic member 94 near its connection to the bracket 95 and tends to urge the piece 101 mechanically into engagement with the electrical contact part 104.

It should be appreciated from the foregoing that the overload protector disclosed above is adaptable to any type of three-phase AC motor and serves dual purpose of warning of overload conditions and effectively breaking the circuit to the motor when such conditions are sufficiently serious to cause irreparable harm.

FIG. 5 illustrates a modification of the circuit arrangement for the components shown in FIG. 1. The same reference numerals, however, have been utilized for similar parts. It will be appreciated with reference to FIG. 1, that if power loss occurred in the phase leading to terminal 10, power would not be provided for actuating solenoid 55. To overcome same, a three phase delta-delta 220/110 volt transformer 165 is provided in the circuit of FIG. 5, which is connected to each motor lead terminal 36, 35 and 34 via leads 166, 167 and 168, respectively. These leads connect to the primary 170 of the transformer 165, as shown. From the secondary 171, are three further leads 172, 173 and 174. Lead 174 is connectable to the solenoid 55 through contact members 45 and 46 of switch 6 and contact members 46 and 52 of switch 7. For switch 7, a further movable contact member 175 is provided which will make contact with stationary contact member 176 when tappet 42 moves downwardly as seen in FIG. 5 so as to press contact member 175 against contact member 176. When this occurs an indicator 177 is energized via lead 180 from current supplied through leads 174 and 172. Indicator 177 is included to indicate an abnormally low current passing through switch 7. A further indicator 181 is energized by leads 172 and 173 to show that the transformer 165 is energized. An overload condition is indicated by indicator 182 which is energized by leads 172 and 173 via a further connecting lead 184 and contact members 44 and 50 when brought into contact by tappet 40. When the solenoid 55 is actuated and all three switches 5, 6 and 7 are thereby placed in an open condition, indicators 190, 191 and 192 are energized and, because their resistance is high compared to the resistance of transformer 165, power to the transformer 165 is interrupted for all practical purposes; that is, the current passing through transformer 165 is minimal.

The inclusion of the delta-delta transformer 165 in modified circuit of FIG. 5 presents several advantages. Thus the indicators and the solenoid 55 each utilize the lower 110 voltage. The device can be applied to either a grounded or an ungrounded motor or system and, importantly, if one phase of the input is lost, power is still available to actuate solenoid 55. Thus with only two leads from the input to the transformer 165 operative, sufficient power is still available from the transformer 165 for purposes of energizing solenoid 55 and indicator 182.

It will be understood that in other respects, the device disclosed in FIG. 5 operates in the same manner as the embodiment disclosed with reference to FIG. 1.

Figure 6:
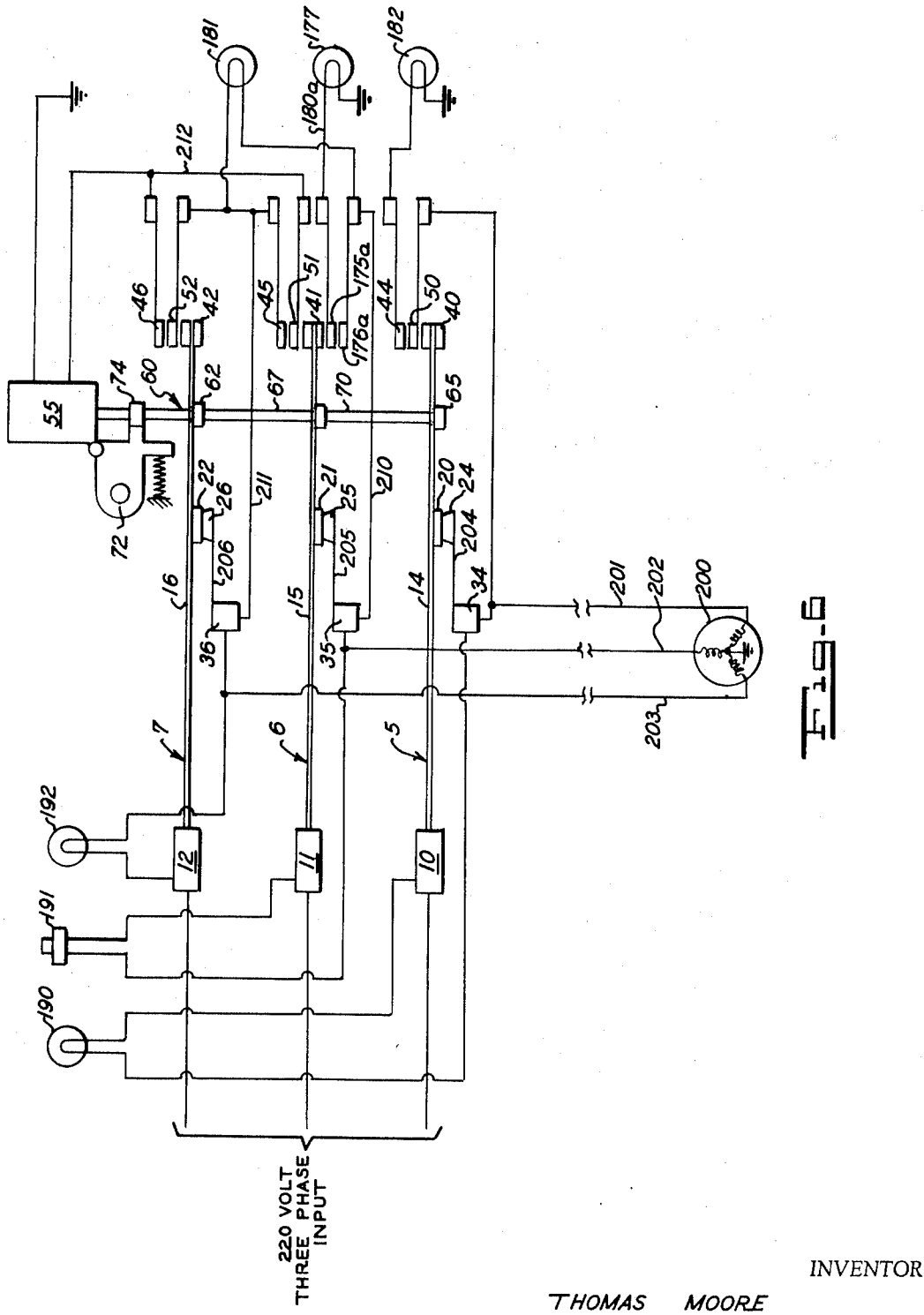

The modification shown in FIG. 6 is similar to that shown in FIGS. 1 and 5 and the same reference numerals have been utilized for similar components. In this modification will be noted that a three phase grounded motor 200 is connected to the motor terminal leads 34, 35 and 36 via conductors 201, 202 and 203, respectively. Solenoid 55 is actuated by the contacts 46 and 52 and/or 51 and 45 and when actuated, opens the main contacts 22 and 26, 21 and 25, and 20 and 24 simultaneously. Provision is also made for indicating an underload or no load condition by indicator 177 through the connection of contacts 175a and 176a when tappet 41 is moved downward as seen in FIG. 6 because of a reduction of current through bimetallic element 15. The contact points 24, 25 and 26 are mounted on flexible strips 204, 205 and 206, respectively. This construction allows for a limited movement of the contacts, 22 and 26, 21 and 25, and 20 and 24, as the bimetallic strips 16, 15 and 14 bend in response to changes in the amount of current going through such strips. Accordingly, there is a continuity in the electrical energy through the switches of 7, 6 and 5 until the solenoid 55 is energized. Such a construction additionally permits a small amount of motion or "wipe" when the contacts are closed. Such "wipe" lessens the build-up of high resistent film on the faces of the contact which are caused by arcing.

Under normal conditions, the motor 200 is supplied with three phase power and no overload condition exists. In such circumstance, the indicator 181 (which may be a green light) glows to indicate normal voltage across terminals 35 and 36 via leads 210 and 211. Should the load on motor 200 decrease and less current flows through the bimetallic strips 14, 15 and 16, the temperature of same decreases and the bend downwardly as seen in FIG. 6. This causes a set of auxillary contacts 175a and 176a to be closed by tappet 41 to energize, via lead 180a, an indicator 177 which may be a blue light. If the motor 200 thereafter recovers its load, the bimetallic strip 15 bends back or upwardly as seen in FIG. 1 thus extinguishing indicator 177. Should an excessive load condition develop, the bimetallic strips are heated by increased current flow and bend upward as seen in FIG. 6. The bend which takes place in bimetallic strip 14 first causes contact members 44 and 50 to be brought into contact by tappet 40 thus causing the indicator 182 (which may be a yellow warning light) to be energized. Should the current subsequently reduce, indicator 182 is extinguished. However, if the overload condition persists or becomes worse, one or both of the overload contacts 45 and 51 and/or 46 and 52 are brought together by their associated tappets 41 and 42, respectively, and the solenoid 55 is actuated via circuit 212. The spring loaded locking device 72 then drops to lock solenoid 55 in its retracted position. When the contacts 20 and 24, 21 and 25, and 22 and 26 are opened the voltage at the motor lead terminals 34, 35 and 36 falls almost to zero due to the comparatively high resistance of the overload trip indicators 190, 191 and 192. Thus current flow through the motor 200 and solenoid 55 is virtually nil and, the motor 200 is stopped.

Having thus described my invention, what I claim as new and desire to secure by Letters Patent of the United States is:

1. A device for effecting and indicating the discontinuance of voltage to a three-phase AC electrical motor when said motor is overloaded which comprises:
   a receptacle,
   three quick acting electrical heat switches mounted in said receptacle,
   three circuit means in said receptacle, each of said circuit means being connectable to one phase of a three-phase AC source, each of said circuit means being in series through one of said switches with said three-phase AC motor, said motor having a predetermined power rating,
   each of said switches being normally closed and adapted to open when current passing therethrough exceeds an amount relative to the power rating of said motor,
   a solenoid in said receptacle operatively connected to each of said switches whereby when said solenoid is actuated, each of said switches is opened by said solenoid,
   three electrical contact means mounted in said receptacle, each relative to a different one of said switches whereby when one of said switches opens at least in part it makes an electrical connection with its corresponding contact means,
   further circuit means interconnecting each of said contact means, and said solenoid for actuating said solenoid whereby when one of said switches opens sufficiently to make an electrical connection with its corresponding contact means, said solenoid is actuated and all of said three switches are opened.

2. A device in accordance with claim 1 which comprises toggle means mounted in said receptacle relative to said solenoid, said toggle means adapted to engage said solenoid upon its actuation and maintain said three switches in an opened position.

3. A device in accordance with claim 2 which comprises a further switch in said further circuit means operatively connected to said toggle means whereby when said toggle means engages said solenoid to maintain said three switches in an opened position, electrical energy to said solenoid is secured.

4. A device in accordance with claim 1 which comprises indicia means mounted on said receptacle, said indicia means having a high electrical resistance compared to said motor, said indicia means being activated electrically by the energization of said further circuit means.

5. A device in accordance with claim 4, said indicia means being electrically in series with and between a phase of said AC source and a phase of said AC motor when one of said switches is opened, voltage across said pass is substantially eliminated.

6. A device in accordance with claim 5 wherein said indicia means is a lamp.

7. A device in accordance with claim 5 where said indicia means is a noise producing means.

8. A device in accordance with claim 5 wherein there are three of said indicia means, each of said indicia means being in series with a different of said AC motor phases.

9. A device in accordance with claim 8 wherein one of said indicia means is a lamp and the other of said indicia means is a noise producing means.

10. A device in accordance with claim 1 wherein each said switch includes a bimetallic member as an actuating member.

11. A device for effecting the complete discontinuance of electrical power to a three-phase AC electrical motor when said motor is overloaded which comprises:
   insulated support means,
   three switch means each including a bimetallic element mounted on said support means,
   three circuit means mounted in said support means, each of said circuit means being connectable to one phase of a three phase AC source, each of said circuit means being in series through the bimetallic element in one of said switches with a phase of said three-phase AC motor, said motor having a predetermined power rating,
   each bimetallic element of said switch normally carrying the full current of its corresponding phase and being operatively connected with disconnect means adapted to disconnect said phase when the current in said phase exceeds a predetermined amount in response to the bending of said bimetallic element, and
   interlocking means associated with said disconnect means adapted to disconnect simultaneously the three phases to said motor in response to activation of said disconnect means by the bending of any of said bimetallic elements.

12. A device in accordance with claim 11 wherein said disconnect means includes a single solenoid which directly effects the simultaneous disconnection of said phases.

13. A device in accordance with claim 12 wherein said disconnect means includes toggle means operative with said solenoid whereby when said disconnect means is activated, said toggle means causes said solenoid to be retained in a position wherein said phases remain disconnected until said toggle means is manually reset.

14. A device for effecting the discontinuance of current to an electrical AC motor when said motor is overloaded which comprises:

insulated support means, switch means including a bimetallic element mounted on said support means, circuit means mounted in said support means, said circuit means being connectable to current for energizing said motor and in series with the bimetallic element of said switch means whereby the current which energizes said motor is conducted through said bimetallic element, and indicia means operatively connected to said switch means whereby when the current passing through said bimetallic element exceeds a predetermined amount, said switch activates said indicia means and at the same time disconnects said current which energizes said motor.

15. A device in accordance with claim 14 wherein said indicia means is a lamp.

* * * * *